April 10, 1934.  F. J. RITZ  1,954,100
MEANS FOR INITIALLY OPENING A REMOTELY POSITIONED VALVE
Original Filed July 23, 1930
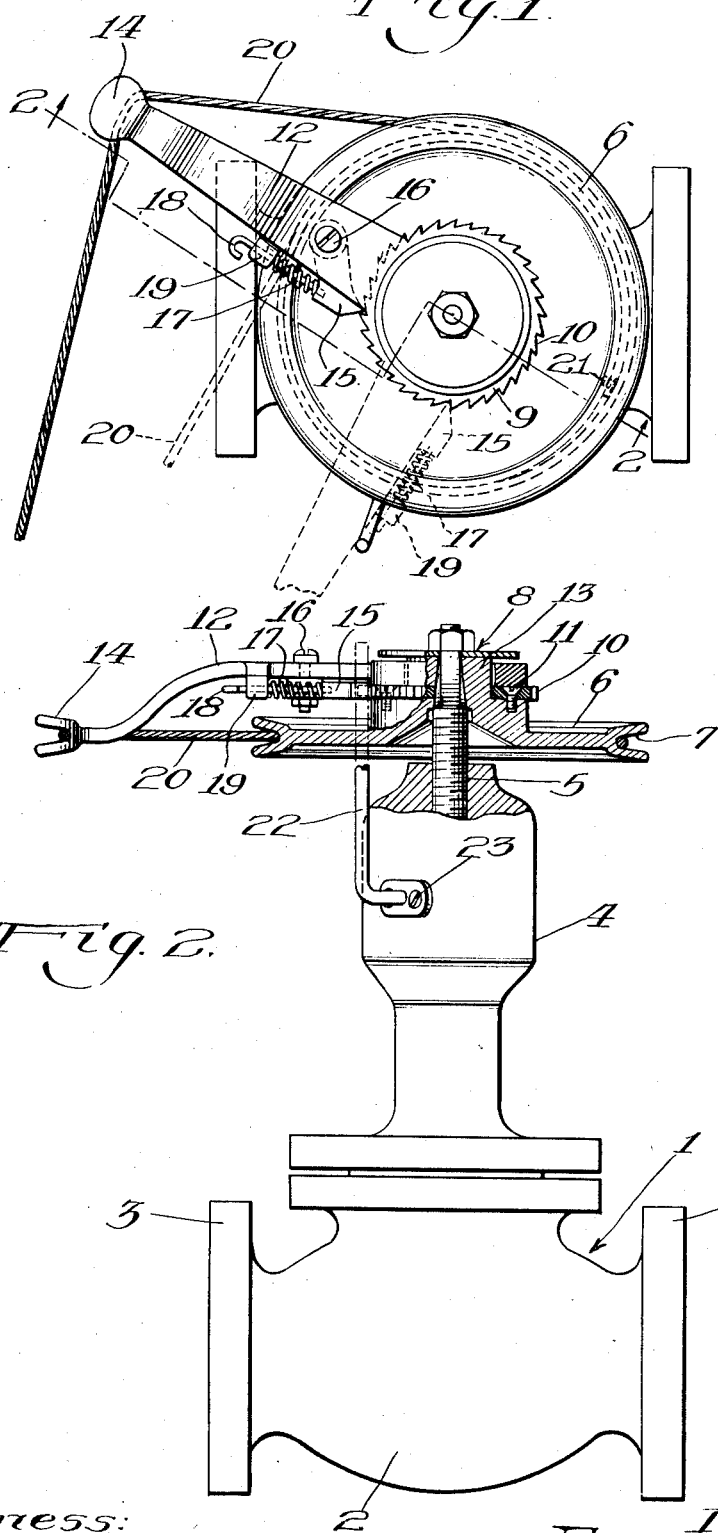

Patented Apr. 10, 1934

1,954,100

UNITED STATES PATENT OFFICE 1,954,100

MEANS FOR INITIALLY OPENING A REMOTELY POSITIONED VALVE

Frederick J. Ritz, Chicago, Ill., assignor to Universal Oil Products Company, Chicago, Ill., a corporation of South Dakota Application July 23, 1930, Serial No. 469,999
Renewed January 14, 1932

7 Claims. (Cl. 137—139)

This invention relates to improvements in means for opening a remotely positioned valve, and refers specifically to the provision of a valve having an arm loosely journaled upon the valve stem, which arm may be associated with a ratchet rigidly mounted upon said stem to initially open said valve, said arm being rendered inoperative after the valve has been initially unseated.

The utility, objects and advantages of my invention will be apparent from the accompanying drawing and following detailed description. In the drawing, Figure 1 is a top plan view of a valve provided with my novel opening device; and Figure 2 is a vertical elevation, partly in section, of the device as shown in Fig. 1.

Referring in detail to the drawing, 1 indicates a valve having the usual body 2 provided with flanges 3 by which means said valve may be interposed in a pipe line. A bonnet 4 may be surmounted upon valve body 2 and may serve as a journaling means for a valve stem 5, by rotation of which the valve may be opened or closed. It is to be understood, of course, that my invention is not dependent upon the particular type of valve used, inasmuch as my invention can be used with globe valves, gate valves, or any of the standard type valves which are opened and closed by the rotation of a valve stem.

A valve wheel 6 provided with an annular groove 7 in its periphery may be mounted upon the upper end of stem 5 and may be adapted to turn as a unit with said stem. Wheel 6 may be maintained in operative position upon said valve stem by means of a conventional nut and washer arrangement 8. An annular ring 9 provided at its outer periphery with ratchet teeth 10 may be rigidly mounted upon valve wheel 6 by means of screws or the like 11.

An arm 12 may be rotatably mounted upon the hub 13 of the wheel 6 and may extend outwardly therefrom, said arm being bent downwardly at its outer extremity to position said outer extremity in a plane common to the plane of the groove 7. The outer extremity of the arm 12 may terminate in a bifurcated prong 14, the purpose of which will be hereinafter more fully described.

A pawl 15 pivotally mounted at 16 on arm 12 may have its operative end associated with the ratchet teeth 10 by means of an impelling spring 17, which may encircle pin 18, which in turn may be connected to pawl 15. One end of pin 18 may be guided and held in operative position by means of lug 19.

In operation when valve 1 is to be closed, the same may be accomplished by manually turning valve wheel 6 to the right until the valve is properly seated. To accomplish this it is necessary to disengage pawl 15 from the ratchet teeth 10 by pulling pin 18 outwardly against the impelling force of spring 17. In this manner the valve wheel 6 may be rotated to the right or clockwise, independent of arm 12.

A cable 20 may be fastened at one end thereof as at 21 in groove 7. When the valve 6 has been tightly closed, cable 20 may be wound in said groove and the intermediate portion thereof may be passed through bifurcated prong 14 at the end of arm 12 which may be set in a position at right angles to the direction from which cable 20 is to be subsequently pulled when it is desired to open the valve. It can readily be seen that when it is desired to open valve 1, cable 20 may be pulled, and by the provision and suitable positioning of arm 12 said force may act similar to a moment of force applied at a distance from the valve stem 5 equal to the length of the arm 12. In this manner considerable leverage may be obtained and the valve may be readily unseated. When the arm 12 has rotated substantially 90° from its set position, the same may contact stop 22 which may be mounted upon bonnet 4 as at 23. In reaching said stop, prong 14 will have become disengaged from the cable 20, permitting said cable to resume its normal position within the groove 7. The valve may be entirely opened by continuing the pull upon cable 20 until said cable has been entirely unwound from the valve wheel 6. During this unwinding operation arm 12 will be maintained in its position adjacent stop 22 and pawl 15 will ride inoperatively over the ratchet teeth 10. The position of arm 12 at this period is shown best in dotted lines in Figure 1.

It is apparent that herein is provided a means for quickly and conveniently initially unseating a valve and upon accomplishment of the initial movement of the valve stem, means for further moving the said stem at a more rapid rate. My invention is simple in operation; can be operated quickly and with ease and is susceptible of economical manufacture, and yet is efficient in operation and highly useful particularly in boiler room installations, distillation and cracking plants, and in general any place where valve controlled pipelines are used and where said valves may be positioned in remote and inaccessible places, especially valves which are seldom used and are likely to become corroded and/or jambed.

I am aware that many changes in details of construction may be made without departing from the spirit of my invention, and hence I do not wish to be limited except as necessitated by the prior art.

I claim as my invention:

1. In combination, a valve having a body, a bonnet mounted upon said body, a valve stem operatively disposed in said body and bonnet, means associated with said valve stem for normally rotating said stem, an arm rotatably associated with said valve stem, flexible means connected at one end to the normal rotating means at a point thereon spaced from the valve stem, said flexible means being operatively associated intermediate its length with one end of said arm, and means for locking said arm with said valve stem upon rotation of said arm in one direction.

2. In combination, a valve having a body, a bonnet mounted upon said body, a valve stem operatively disposed in said body and bonnet, means associated with said valve stem for normally rotating said stem, an arm rotatably associated with said valve stem, flexible means connected at one end to the normal rotating means, said flexible means being operatively associated intermediate its length with one end of said arm, and means for locking said arm with said valve stem upon rotation of said arm in one direction.

3. In combination, a valve having a valve stem for operating same, a wheel having a grooved periphery operatively associated with said stem, flexible means connected at one end in a portion of said groove, an arm rotatably associated with said valve wheel having a groove at its outer periphery in the same plane as the groove in the wheel for the reception of an intermediate portion of said flexible means, and means for locking said arm with respect to said wheel upon rotation of said arm in a predetermined direction.

4. In combination, a valve having a valve stem, an arm journaled upon the valve stem, means for locking the arm for rotational movement with the stem, flexible means cooperating with said arm for rotating the valve stem, and means for rendering the locking means inoperative after initial rotation of the valve stem.

5. In combination, a valve having a valve stem, an element operably associated with said stem adapted to effect its initial movement, means associated with said element to secure it in operable relationship with said stem, means for limiting the degree of movement of said element, and means for continuing the movement of said stem upon arrest of movement of said element.

6. In combination, a valve having a valve stem, an element operably associated with said stem adapted to initially move the same, locking means associated with said element to secure it in operable relationship with said stem, means for arresting movement of said element and rendering the same inoperable relative to said stem, and means for continuing the movement of said valve stem after its initial movement by said element comprising a flexible element operably disposed about said valve stem and over said element.

7. In combination, a valve having a valve stem, a lever journaled upon the valve stem, means for locking said lever for rotational movement with said stem, means cooperating with said lever for rotating the valve stem, and means for rendering the locking means inoperative after initial rotation of the valve stem.

FREDERICK J. RITZ.